(12) United States Patent
Yun et al.

(10) Patent No.: US 11,393,627 B2
(45) Date of Patent: Jul. 19, 2022

(54) MULTILAYER CERAMIC ELECTRONIC COMPONENT

(71) Applicant: SAMSUNG ELECTRO-MECHANICS CO., LTD., Suwon-si (KR)

(72) Inventors: Hyung Duk Yun, Suwon-si (KR); Seonyoung Yoo, Suwon-si (KR); Byeongguk Choi, Suwon-si (KR); Young Hoon Song, Suwon-si (KR); Yuseop Lee, Suwon-si (KR); A Ra Cho, Suwon-si (KR); Dong Hwi Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 28 days.

(21) Appl. No.: 16/867,706

(22) Filed: May 6, 2020

(65) Prior Publication Data
US 2021/0175016 A1 Jun. 10, 2021

(30) Foreign Application Priority Data
Dec. 6, 2019 (KR) ........................ 10-2019-0161732

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
None
See application file for complete search history.

(56) References Cited

U.S. PATENT DOCUMENTS 5,905,000 A * 5/1999 Yadav ..................... C01F 11/06
429/482
6,917,511 B1 * 7/2005 Bryan ..................... H01G 4/08
361/321.2
(Continued)

FOREIGN PATENT DOCUMENTS

CN 1273615 A * 11/2000 .......... H01M 4/0419
CN 104882276 A * 9/2015 ............ H01G 4/228
(Continued)

OTHER PUBLICATIONS

Ayode. Advanced_ceramic_components. 2020 (Year: 2020).*
(Continued)

*Primary Examiner* — Timothy J. Dole
*Assistant Examiner* — Muhammed Azam
(74) *Attorney, Agent, or Firm* — Morgan, Lewis & Bockius LLP

(57) ABSTRACT

A multilayer ceramic electronic component includes a ceramic body including a dielectric layer and first and second internal electrodes stacked with the dielectric layer interposed therebetween, and including first and second external electrodes disposed on the fifth surface and the sixth surface of the ceramic body, respectively, the first and second external electrodes include first and second base electrodes including a first conductive metal and reactive glass, in contact with the ceramic body, and first and second conductive layers including and a second conductive metal, disposed on the first and second base electrodes, and a nanostructure may be disposed on surfaces of the first and second conductive layers.

22 Claims, 10 Drawing Sheets

(56) References Cited

U.S. PATENT DOCUMENTS

| | | | | |
|---|---|---|---|---|
| 7,754,388 | B2* | 7/2010 | Nakagawa | H01M 10/0525 |
| | | | | 429/324 |
| 8,138,414 | B2* | 3/2012 | Jung | B82Y 30/00 |
| | | | | 136/256 |
| 8,222,077 | B2* | 7/2012 | Gong | G02F 1/1365 |
| | | | | 438/104 |
| 8,465,875 | B2* | 6/2013 | Hosoe | H01G 11/70 |
| | | | | 429/235 |
| 8,767,375 | B2* | 7/2014 | Park | H01G 4/12 |
| | | | | 361/306.3 |
| 8,941,972 | B2* | 1/2015 | Park | H01G 4/12 |
| | | | | 361/301.4 |
| 8,952,372 | B2* | 2/2015 | Sekiguchi | H01L 51/0067 |
| | | | | 257/40 |
| 9,013,023 | B2* | 4/2015 | Suzuka | H01L 51/508 |
| | | | | 257/461 |
| 9,159,497 | B2* | 10/2015 | Lee | H01L 29/786 |
| 9,218,908 | B2* | 12/2015 | Kim | H01G 4/30 |
| 9,230,740 | B2* | 1/2016 | Chae | H01G 2/06 |
| 9,240,280 | B2* | 1/2016 | Kim | H01G 4/232 |
| 9,258,893 | B2* | 2/2016 | Kwag | H01G 4/30 |
| 9,424,989 | B2* | 8/2016 | Kim | H01G 4/2325 |
| 9,466,424 | B2* | 10/2016 | Lee | H01G 4/232 |
| 9,472,352 | B2* | 10/2016 | Hayashi | H01L 51/0064 |
| 9,640,335 | B2* | 5/2017 | Tsukagoshi | H01M 4/625 |
| 9,708,717 | B2* | 7/2017 | Ono | C25B 11/03 |
| 9,859,056 | B2* | 1/2018 | Yoshida | H01G 4/012 |
| 10,102,970 | B2* | 10/2018 | Baba | H01L 23/645 |
| 10,586,653 | B2* | 3/2020 | Asano | H01G 4/14 |
| 10,658,116 | B2* | 5/2020 | Kim | H01G 4/2325 |
| 10,825,609 | B2* | 11/2020 | Terashita | H01G 2/065 |
| 10,964,478 | B2* | 3/2021 | Asano | H01G 4/30 |
| 10,973,120 | B1* | 4/2021 | Lee | B32B 27/32 |
| 2004/0058504 | A1* | 3/2004 | Kellar | H01L 28/84 |
| | | | | 438/383 |
| 2005/0219788 | A1* | 10/2005 | Chow | H01G 4/06 |
| | | | | 361/321.1 |
| 2008/0068780 | A1* | 3/2008 | Shioga | H01G 4/008 |
| | | | | 361/524 |
| 2013/0004856 | A1* | 1/2013 | Hosoe | H01G 11/74 |
| | | | | 429/245 |
| 2013/0107420 | A1 | 5/2013 | Sakurada et al. | |
| 2018/0166222 | A1* | 6/2018 | Ferris | H01G 11/30 |
| 2020/0303124 | A1* | 9/2020 | Masunari | H01G 4/008 |
| 2021/0090803 | A1* | 3/2021 | Kang | H01G 4/2325 |
| 2021/0175016 | A1* | 6/2021 | Yun | H01G 4/2325 |

FOREIGN PATENT DOCUMENTS

| | | | | |
|---|---|---|---|---|
| CN | 108511116 | A | * 9/2018 | |
| EP | 2924699 | A1 | * 9/2015 | H01G 4/008 |
| JP | 1994-112085 | A | 4/1994 | |
| JP | 2002-208535 | A | 7/2002 | |
| JP | 2013-118357 | A | 6/2013 | |
| KR | 20000011057 | A | * 2/2000 | H01G 11/48 |
| RU | 2444078 | C1 | * 2/2012 | B82Y 10/00 |
| WO | WO-2016085004 | A1 | * 6/2016 | C23C 16/458 |

OTHER PUBLICATIONS

"Standard Reduction Potentials by Element". Chemistry LibreTexts. https://chem.libretexts.org/Ancillary_Materials/Reference/Reference_Tables/Electrochemistry_Tables/P1%3A_Standard_Reduction_Potentials_by_Element (Year: 2021).*
NanoTechnology_And_Nanomaterials. Padeepz. (Year: 2018).*
Nano structured materials. Nptel. (Year: 2014).*
Nanostructures and Nanomaterials. Nptel. (Year: 2014).*

* cited by examiner

MULTILAYER CERAMIC ELECTRONIC COMPONENT

CROSS-REFERENCE TO RELATED APPLICATION(S)

This application claims benefit of priority to Korean Patent Application No. 10-2019-0161732 filed on Dec. 6, 2019 in the Korean Intellectual Property Office, the disclosure of which is incorporated herein by reference in its entirety.

BACKGROUND

1. Field

The present disclosure relates to a multilayer ceramic electronic component.

2. Description of Related Art

With the trend for reducing the sizes of electronic products, a multilayer ceramic electronic component has been required to have a reduced size and increased capacitance. In accordance with the demand for a reduced size and increased capacity of a multilayer ceramic electronic component, an external electrode of a multilayer ceramic electronic component has also been designed to have a reduced thickness.

To form such an external electrode, a paste for an external electrode may be prepared by mixing a general conductive metal with glass, a base resin, an organic solvent, and the like, the paste for an external electrode may be applied to both surfaces of a ceramic body, and the ceramic body may be backed out such that a metal may be sintered in the external electrode. The paste for an external electrode may guarantee chip-sealing properties and electrical connectivity with a chip using a conductive metal as a main material, and using glass as an auxiliary material, the paste may fill an empty space and may also provide cohesion force between an external electrode and a chip when the metal is sintered and reduced.

However, as a multilayer ceramic electronic component is designed to have a reduced size and increased capacitance, the number of layers of internal electrodes may be designed to be increased to secure capacitance, and an upper cover layer may be designed to have a reduced thickness. Accordingly, an external electrode may have a reduced size, and when an external electrode having a multilayer structure is applied, a thickness of each layer of the external electrodes may further be reduced.

A multilayer ceramic electronic component in which an external electrode having a multilayer structure as above is applied, however, may be vulnerable to external physical and chemical impacts, and may cause degradation of product quality due to degradation of mechanical strength.

SUMMARY

An aspect of the present disclosure is to provide a multilayer ceramic electronic component in which cohesion force between external electrodes layered in order in a multilayer structure may improve even when the external electrode has a reduced thickness.

Another aspect of the present disclosure is to provide a multilayer ceramic electronic component having improved mechanical strength.

Another aspect of the present disclosure is to provide a multilayer ceramic electronic component which may prevent defects such as an air gap between external electrodes, delamination, and the like.

According to an aspect of the present disclosure, a multilayer ceramic electronic component includes a ceramic body including a dielectric layer and first and second internal electrodes stacked in a third direction with the dielectric layer interposed therebetween, and including a first surface and a second surface opposing each other in a third direction, a third surface and a fourth surface opposing each other in a second direction, and a fifth surface and a sixth surface opposing each other in a first direction; and first and second external electrodes disposed on the fifth surface and the sixth surface of the ceramic body, respectively, the first and second external electrodes include the first and second external electrodes include first and second base electrodes including a first conductive metal and reactive glass, in contact with the ceramic body, and first and second conductive layers including a second conductive metal, disposed on the first and second base electrodes, wherein a nanostructure may be disposed on surfaces of the first and second conductive layers.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
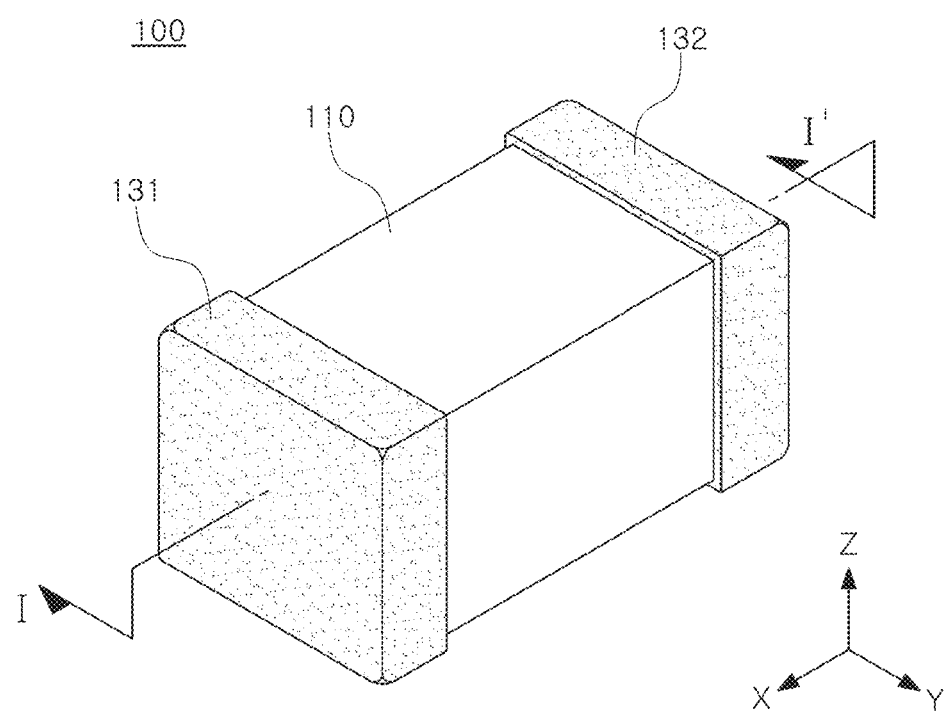
FIG. 1 is a perspective diagram illustrating a multilayer ceramic electronic component according to an example embodiment of the present disclosure.

Hereinafter, embodiments of the present disclosure will be described as follows with reference to the attached drawings.

It should be understood that the following exemplifying description of the present disclosure is not intended to restrict the present disclosure to specific forms of the present disclosure but rather the present disclosure is meant to cover all modifications, similarities and alternatives which are included in the spirit and scope of the present disclosure. The same elements will be indicated by the same reference numerals.

For clarity of description, some elements may be omitted or briefly illustrated, and thicknesses of elements may be magnified to clearly represent layers and regions.

The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof.

In example embodiments, the expressions "A or B," "at least one of A or/and B," or "one or more of A or/and B" may include any possible combinations with other listed items. For example, "A or B," "at least one of A or/and B," or "one or more of A or/and B" may refer to (1) including at least one A, (2) including at least one B, or (3) including at least one A and at least one B.

In the diagram, an X direction may be defined as a first direction, an L direction, or a length direction, a Y direction may be defined as a second direction, a W direction, or a width direction, and a Z direction may be defined as a third direction, a T direction, or a thickness direction.

In the description below, a multilayer ceramic electronic component 100 will be described in accordance with an example embodiment with reference to FIGS. 1 to 5.

Referring to FIGS. 1 to 5, a multilayer ceramic electronic component 100 may include a ceramic body 110 including a dielectric layer 111 and first and second internal electrodes 121 and 122 stacked in a third direction with the dielectric layer 111 interposed therebetween, and including first and second surfaces S1 and S2 opposing each other in the third direction (a Z direction), third and fourth surfaces S3 and S4 opposing each other in a second direction (a Y direction), and fifth and sixth surfaces S5 and S6 opposing each other in a first direction (an X direction); and first and second external electrodes 131 and 132 disposed on the fifth surface S5 and the sixth surface S6 of the ceramic body 110, respectively, and the first and second external electrodes 131 and 132 may include first and second base electrodes 131a and 132a including a first conductive metal and reactive glass, in contact with the ceramic body 110, and may include first and second conductive layers 131b and 132b including and a second conductive metal, disposed on the first and second base electrodes 131a and 132a.

A nanostructure 140 may be disposed on surfaces of the first and second conductive layers 131b and 132b. The surfaces of the first and second conductive layers 131b and 132b on which the nanostructure 140 are disposed are the surfaces on which the terminal electrodes are disposed. In example embodiments, the term "nanostructure" may refer to a fine structure that has a monomer size in which each of a length, a width, and a height has several nm to several tens of μm. The nanostructure 140 may include a one dimensional, a two dimensional and/or a three dimensional structure. As the nanostructure 140 is disposed on surfaces of the first and second conductive layers 131b and 132b applied to the multilayer ceramic electronic component in the example embodiment, surface roughness of the first and second conductive layers 131b and 132b may increase.

Figure 2:
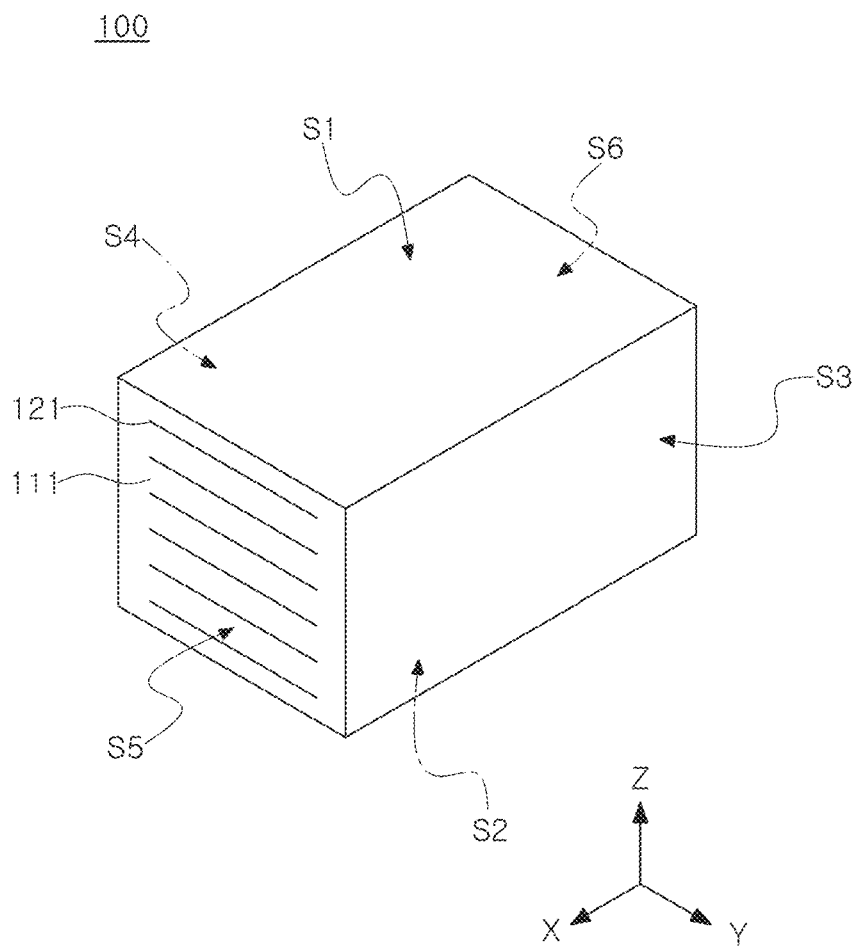
FIG. 2 is a perspective diagram illustrating the ceramic body illustrated in FIG. 1.
Figure 3:
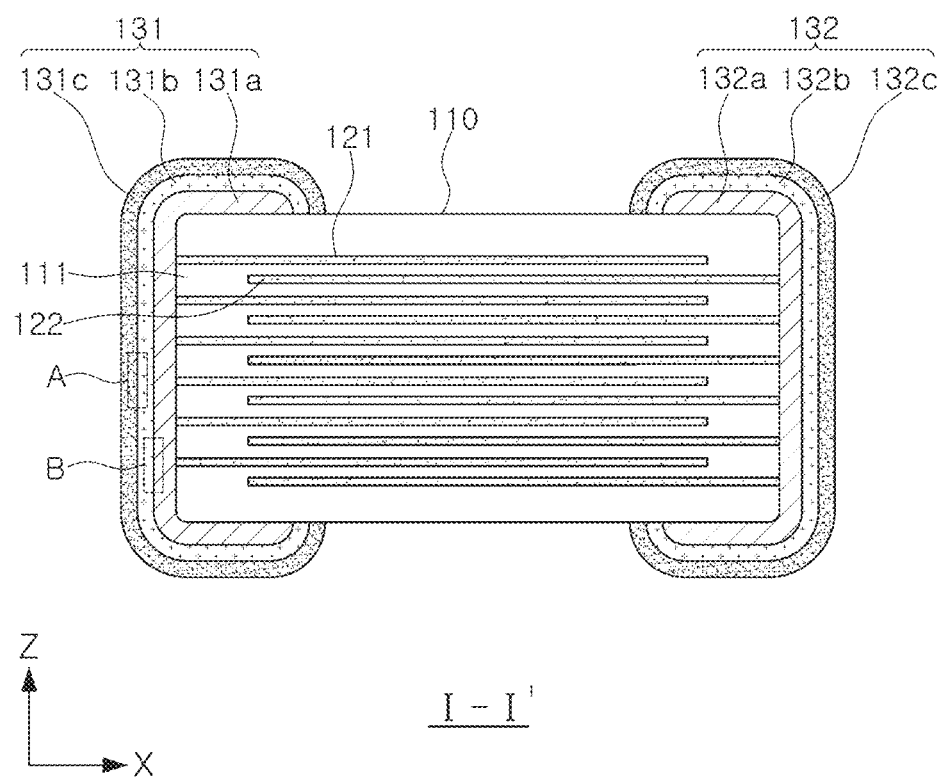
FIG. 3 is a cross-sectional diagram taken along line I-I' in FIG. 1.

A shape of the ceramic body 110 may not be limited to any particular shape, and the ceramic body 110 may have a hexahedral shape or a shape similar to a hexahedron, as illustrated in FIGS. 1 and 2. Due to contraction of ceramic powder particles included in the ceramic body 110 during a sintering process, the ceramic body 110 may not have an exactly hexahedral shape with straight lines, but may have a substantially hexahedral shape. The ceramic body 110 may have the first and second surfaces S1 and S2 opposing each other in a thickness direction (Z direction), the third and fourth surfaces S3 and S4 connected to the first and second surfaces S1 and S2 and opposing each other in a width direction (Y direction), and the fifth and sixth surfaces S5 and S6 connected to the first and second surfaces S1 and S2 and the third and fourth surfaces S3 and S4 and opposing each other in a length direction (X direction).

The ceramic body 110 may be formed by alternately layering a ceramic green sheet on which the first internal electrode 121 is printed on the dielectric layer 111 and a ceramic green sheet on which the second internal electrode 122 is printed on the dielectric layer 111 in the thickness direction (Z direction).

In the ceramic body 110, the dielectric layer 111 and the first and second internal electrodes 121 and 122 may be alternately layered in the third direction. The plurality of dielectric layers 111 included in the body 110 may be in a sintered state, and the dielectric layers 111 may be integrated such that it may be difficult to identify boundaries between adjacent dielectric layers 111 without using a scanning electron microscope (SEM).

In the example embodiment, a material of the dielectric layer 111 may not be limited to any particular material as long as sufficient capacitance can be obtained therewith. For example, the dielectric layer 111 may be formed using a barium titanate material, a Perovskite material compound with lead, a strontium titanate material, or the like.

Also, as the material of the dielectric layer 111, a barium titanate ($BaTiO_3$) powder, or the like, including various ceramic additives, organic solvents, coupling agents, dispersing agents, and the like, may be used depending on an intended purpose.

For example, the dielectric layer 111 may be formed by disposing a plurality of ceramic sheets formed by applying slurry including powder such as barium titanate ($BaTiO_3$) on a carrier film and drying the slurry. The ceramic sheet may be formed by manufacturing slurry formed from a mixture of a ceramic powder, a binder, and a solvent and manufacturing a sheet having a thickness of a several μm using the slurry through a doctor blade process, but an example embodiment thereof is not limited thereto.

In the multilayer ceramic electronic component in the example embodiment, the internal electrodes 121 and 122 may be alternately layered to oppose each other with the dielectric layer 111 interposed therebetween. The internal electrodes 121 and 122 may include the first and second internal electrodes 121 and 122 alternately disposed to oppose each other with the dielectric layer 111 interposed therebetween.

The first internal electrode 121 may be exposed to one surface of the ceramic body 110 taken in the first direction (X direction), and a portion of the first internal electrode 121 exposed to the one surface taken in the first direction (X direction) may be connected to the first external electrode 131. The second internal electrode 122 may be exposed to the other surface of the ceramic body 110 taken in the first direction (X direction), and a portion of the second internal electrode 122 exposed to the other surface taken in the first direction (X direction) may be connected to the second external electrode 132. The first and second internal electrodes 121 and 122 may be electrically separated from each other by the dielectric layer 111 interposed therebetween.

A material of the first and second internal electrodes 121 and 122 may not be limited to any particular material, and may be formed using a conductive paste including one or more materials selected from the group consisting of silver (Ag), palladium (Pd), gold (Au), platinum (Pt), nickel (Ni), copper (Cu), tin (Sn), tungsten (W), titanium (Ti), and alloys thereof. As a method of printing the conductive paste, a screen-printing method, a gravure printing method, or the like, may be used, but the printing method is not limited thereto.

In the multilayer ceramic electronic component in the example embodiment, margin portions may be disposed on both surfaces of the ceramic body 110 in the second direction. The margin portions may be disposed on both surfaces of the ceramic body 110 taken in the second direction (Y direction) perpendicular to the first and third directions (X direction and Z direction), respectively. The margin portions may prevent damage to an internal electrode caused by physical or chemical stress.

The margin portions may be formed of an insulating material, and may be formed of a ceramic material such as barium titanate, or the like. In this case, the margin portions may include the same ceramic material as the ceramic material included in the dielectric layer 111, or may be formed of the same material as the material of the dielectric layer 111.

A method of forming the margin portions is not limited to any particular method. For example, an area of the dielectric layer included in the ceramic body 110 may be configured to be greater than an area of the internal electrode, and a margin region may be formed on a circumferential portion of the internal electrode other than a portion connected to the external electrode, may be formed by applying slurry including ceramic, or may be formed by attaching a dielectric sheet on both surfaces of the ceramic body 110 taken in the second direction (Y direction).

The multilayer ceramic electronic component in the example embodiment may include a cover portion. The cover portion may be disposed in an outermost region of each of the first and second internal electrodes 121 and 122. The cover portion may be disposed on a lower portion of a lowermost internal electrode and an upper portion of an uppermost internal electrode. The cover portion may have a composition the same as a composition of the dielectric layer 111, and may be formed by layering at least one dielectric layer which does not include an internal electrode on the upper portion of an uppermost internal electrode and the lower portion of a lowermost internal electrode of the ceramic body 110. The cover portion may prevent damage to an internal electrode caused by physical or chemical stress.

In the multilayer ceramic electronic component in the example embodiment, the first external electrode 131 and the second external electrode 132 may be disposed on both surfaces of the ceramic body taken in the first direction (X direction). The first external electrode 131 may be connected to the first internal electrode 121, and the second external electrode 132 may be connected to the second internal electrode 122. The first external electrode 131 and the second external electrode 132 may be disposed on the fifth surface S5 and the sixth surface S6 of the ceramic body 110, respectively, may include a first conductive metal and reactive glass, may include the first base electrode 131a and the second base electrode 132a in contact with the ceramic body 110, and the second conductive metal, and may include the first conductive layer 131b and the second conductive layer 132b disposed on the first base electrode 131a and the second base electrode 132a, respectively.

Figure 4:
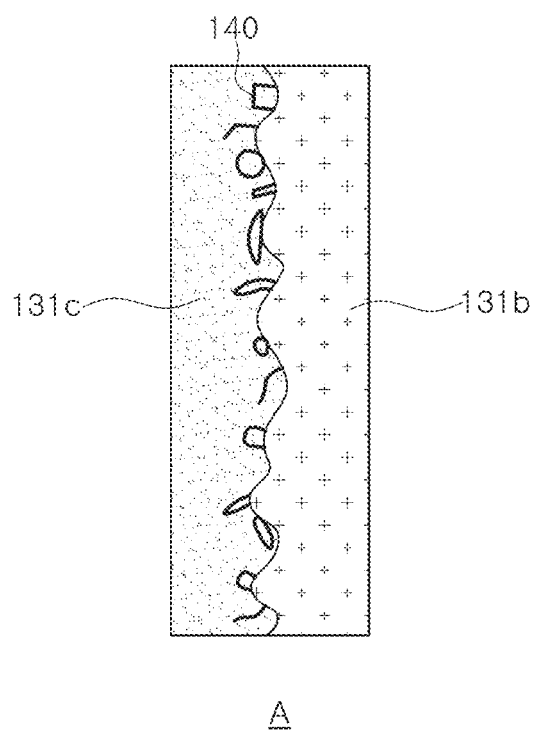
FIG. 4 is an enlarged diagram illustrating region A illustrated in FIG. 3.
Figure 5:
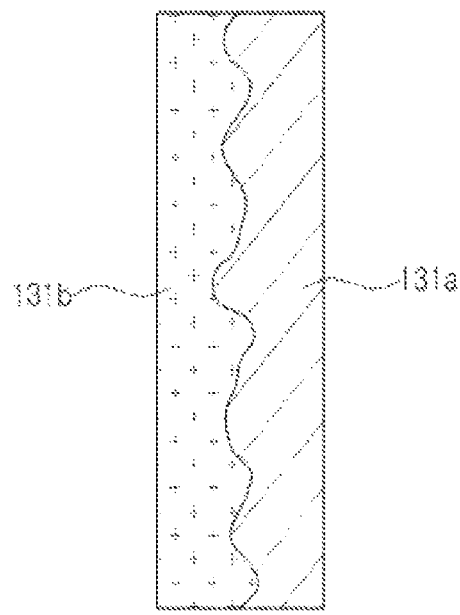
FIGS. 5a and 5b are enlarged diagrams illustrating exemplary embodiments of region B illustrated in FIG. 3.
Figure 5:
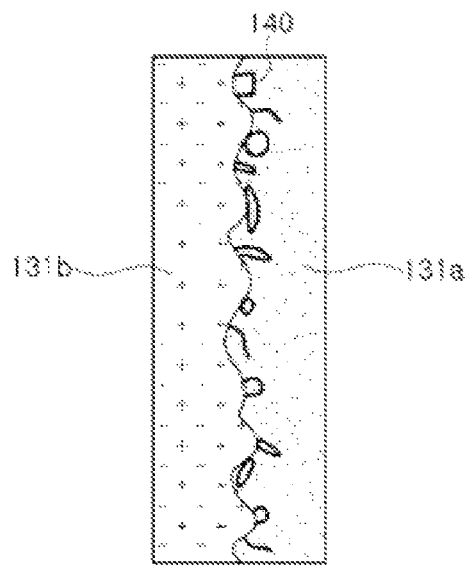

In an example embodiment, the nanostructure disposed on surfaces of the first and second conductive layers may include one or more of the nanostructure 140 selected from a group consisting of a nanoparticle, a nanowire, a nanorod, a nanosheet, a nanobelt, a nanodisk, a nanotube, and a nanotetrapod. FIG. 4 is an enlarged diagram illustrating region A illustrated in FIG. 3. Referring to FIG. 4, the nanostructures 140 may be one example of the nanostructures, and a single shape structure or various shapes of structures may be disposed on surfaces of the first and second conductive layers. The nanostructure may be formed by liquid reduction, which will be described later, may have a randomly selected shape, and may have one or more shapes of the structures described above. When the nanostructure 140 is disposed on the surfaces of the first and second conductive layers 131b and 132b of the example embodiment, an anchoring effect may be implemented due to the nanostructure 140 such that cohesion force with a terminal electrode may improve.

In the example embodiment, an average surface roughness (Ra) of the first and second conductive layers 131b and 132b may be 13.0 μm or greater. In the example embodiment, an average surface roughness (Ra) of one surface may be measured using an optical surface profiler such as a 7300 Optical Surface Profiler of Zygo Corporation or using a surface roughness measuring device SV-3200 of Mitutoyo, or the like. An upper limit of the average surface roughness (Ra) of the first and second conductive layers 131b and 132b of the multilayer ceramic electronic component may not be limited to any particular example, and may be 100 μm or less, for example. When the average surface roughness (Ra) of the first and second conductive layers 131b and 132b satisfy the above-mentioned range, contact properties with the first and second base electrodes 131a and 132a may improve, and cohesion force with first and second terminal electrodes 131c and 132c may improve.

The first and second external electrodes 131 and 132 may include the first and second base electrodes 131a and 132a including the first conductive metal and reactive glass, and the first and second conductive layers 131b and 132b disposed on the first and second base electrodes 131a and 132a and including a second conductive metal, respectively. The first conductive metal and the second conductive metal may be different from each other, and the reactive glass and the second conductive metal may include different elements.

In the example embodiment, the statement that the first conductive metal and/or the reactive glass is different from the second conductive metal may indicate that the first conductive metal and/or the reactive glass and the second conductive metal are different compounds, and that the second conductive metal does not include an ingredient the same as the first conductive metal and/or the reactive glass. In an example embodiment, the first conductive metal and/or the reactive glass included in the first and second base electrodes 131a and 132a may include copper (Cu), and in this case, the second conductive metal may not include copper (Cu).

The first conductive metal included in the first base electrode 131a and the second base electrode 132a may be copper (Cu), but an example embodiment thereof is not limited thereto. For example, the metal may be one or more conductive metals from among nickel (Ni), tin (Sn), palladium (Pd), platinum (Pt), gold (Au), silver (Ag), tungsten (W), titanium (Ti), lead (Pb), and alloys thereof.

In the example embodiment, the first base electrode 131a and the second base electrode 132a may include the first conductive metal and reactive glass. In the example embodiment, the reactive glass may refer to a glass element which may chemically react with a metal. The reactive glass may be an element which may react with the second conductive metal of the first and second conductive layers.

In an example embodiment, average surface roughness (Ra) of the first base electrode 131a and the second base electrode 132a may be 1.0 μm or greater. An upper limit of the average surface roughness (Ra) of the first base electrode 131a and the second base electrode 132a may not be limited to any particular example, and may be 100 μm, for example. When the average surface roughness (Ra) of the first base electrode 131a and the second base electrode 132a satisfies the above-mentioned range, adhesive properties with the first conductive layer 131b and the second conductive layer 132b may improve.

In the example embodiment, a standard reduction potential of the second conductive metal included in the first conductive layer 131b and the second conductive layer 132b may be higher than a standard reduction potential of the reactive glass. In the example embodiment, a standard reduction potential may refer to a potential of when activity of all chemical species participating in redox reaction is 1 under conditions of 25° C., an electrolyte concentration of 1M, and atmospheric pressure of 1, and may refer to a value measured based on a standard hydrogen electrode of 0.00V. A standard reduction potential may indicate relative tendency of reduction/oxidation between different materials, and the higher the standard reduction potential, the stronger the tendency for reduction, and the lower the standard reduction potential, the stronger the tendency for oxidation. Accordingly, in the example embodiment, the statement in which a standard reduction potential of the second conductive metal is higher than that of the reactive glass may indicate that the reactive glass may have a strong tendency for oxidation, and the second conductive metal has a strong tendency for reduction.

In an example embodiment, a standard reduction potential of the second conductive metal of the multilayer ceramic electronic component in the example embodiment may be 0.1 V or higher. A standard reduction potential of the second conductive metal may be 0.1 V or higher, 0.15 V or higher, 0.20 V or higher, 0.25 V or higher or 0.30 V or higher, and may be 2.87 V or less or 1.99 V or less. As the standard reduction potential of the second conductive metal satisfies the above-mentioned range, the first and second conductive layers may be formed, and cohesion force between the first and second conductive layers 131b and 132b and first and second terminal electrodes 131a and 132a may improve.

When the second conductive metal has a standard reduction potential higher than that of the reactive glass, the second conductive metal may be reduced on the reactive glass. For example, when the ceramic body 110 on which the first base electrode 131a and the second base electrode 132a are disposed is immersed in an aqueous solution in which the second conductive metal is melted in the form of ions, the second conductive metal may be reduced and precipitated on the first base electrode 131a and the second base electrode 132a. The second conductive metal precipitated on the first base electrode 131a and the second base electrode 132a may form an irregular nanostructure, may have a nanostructure form, and may form the first conductive layer 131b and the second conductive layer 132b. Accordingly, the first conductive layer 131b and the second conductive layer 132b may be reduction layers of the second conductive metal.

The redox reaction in an aqueous solution of a certain material may be performed randomly on a surface of a material having a solid phase. For example, when the first base electrode 131a and the second base electrode 132a including the reactive glass is immersed in an aqueous solution in which the second conductive metal having a standard reduction potential higher than that of the reactive glass is melted, the reactive glass of the first base electrode 131a and the second base electrode 132a may be randomly oxidized, and the second conductive metal may be randomly reduced on the first base electrode 131a and the second base electrode 132a. In this case, the first conductive layer 131b and the second conductive layer 132b reduced on the first base electrode 131a and the second base electrode 132a may be a single composition layer of the second conductive metal. Also, as the reactive glass included in the first base electrode 131a and the second base electrode 132a is randomly oxidized, surfaces of the first base electrode 131a and the second base electrode 132a may have the above-mentioned average surface roughness (Ra).

In an example embodiment, the second conductive metal applied to the first and second conductive layers 131b and 132b may not be limited to any particular example as along as the above-mentioned standard reduction potential is satisfied. As an example of the second conductive metal, although not limited thereto, silver (Ag), platinum (Pt), gold (Au), tin (Sn), and/or iron (Fe), or the like, may be used. However, an example embodiment thereof is not limited thereto, and a conductive metal having a standard reduction potential higher than that of the reactive glass applied to the first and second base electrodes 131a and 132a may be used.

In an example embodiment, the reactive glass may include one or more elements selected from a group consisting of silicon (Si), boron (B), aluminum (Al), a transition metal, an alkali metal, an alkali earth metal, and an oxide, a nitride, a carbide, and a carbonate thereof, but an example embodiment thereof is not limited thereto. The transition metal may be selected from a group consisting of zinc (Zn), titanium (Ti), copper (Cu), vanadium (V), manganese (Mn), iron (Fe), and nickel (Ni), the alkali metal may be selected from a group consisting of lithium (Li), sodium (Na), potassium (K), and the alkali earth metal may be selected from a group consisting of manganese (Mn), calcium (Ca), strontium (Sr), and barium (Ba).

A method of forming the first and second base electrodes 131a and 132a is not limited to any particular method. For example, various methods such as a method of dipping the ceramic body in conductive paste including the first conductive metal and the reactive glass, a method of printing the conductive paste on a surface of the ceramic body by a screen printing method or a gravure printing method, a method of applying the conductive paste on a surface of the ceramic body, or a method of transferring a dried film formed by drying the conductive past on the ceramic body may be used, but an example of the method is not limited thereto.

In the example embodiment, the multilayer ceramic electronic component may include the first terminal electrode 131c disposed on the first conductive layer 131b and the second terminal electrode 132c disposed on the second conductive layer 132b. The first and second terminal elecof 0.02 M, and it was observed that a nanostructure started being formed on a surface of the external electrode after 30 seconds elapsed, and that a nanostructure was distinct after 150 seconds or more. Also, referring to FIGS. 7a, 7b and 7c, after 300 seconds after the chip was immersed in the silver nitrate solution, a nanostructure was also formed even in the case in which a molar concentration was 0.01 M.

TABLE 1

| Example Embodiment | Reaction Method | | Process Condition Reaction Molar Concentration of silver nitrate (M) | Reaction Time (min) | Surface Roughness ($R_a$: um) | Electrical Properties (ESR: mΩ) | Interfacial Air Gap in Primary-Secondary External Electrodes |
|---|---|---|---|---|---|---|---|
| | Dipping | Contact | | | | | |
| 1 | O | X | 0.005M | 5 min | 6.5 μm | 6.2 mΩ | NG |
| 2 | O | X | 0.01M | 5 min | 7.8 μm | 6.0 mΩ | NG |
| 3 | O | X | 0.02M | 5 min | 12.7 μm | 5.9 mΩ | NG |
| 4 | O | X | 0.05M | 5 min | 17.3 μm | 4.1 mΩ | OK |
| 5 | X | O | 0.005M | 5 min | 6.1 μm | 7.1 mΩ | NG |
| 6 | X | O | 0.01M | 5 min | 7.2 μm | 6.8 mΩ | NG |
| 7 | X | O | 0.02M | 5 min | 11.7 μm | 5.1 mΩ | OK |
| 8 | X | O | 0.05M | 5 min | 15.3 μm | 3.5 mΩ | OK | trodes 131c and 132c may be formed using conductive paste including a conductive metal, may be formed by transferring a dried film formed by drying the conductive past on the ceramic body, or may be formed using a sputtering process or electric deposition, but an example embodiment thereof is not limited thereto.

A material of the first and second terminal electrodes 131c and 132c is not limited to any particular material, and may include nickel (Ni), copper (Cu), tin (Sn), palladium (Pd), platinum (Pt), gold (Au), silver (Ag), tungsten (W), titanium (Ti), lead (Pb), and alloys thereof. By including the first and second terminal electrodes 131c and 132c, mounting properties, structural reliability, durability against external elements, thermal resistance and/or equivalent series resistance (ESR) may improve.

Experimental Example

A multilayer ceramic electronic component (MLCC) chip including an external electrode that includes copper (Cu) as a first conductive metal and including BaO, CaO, ZnO, $Al_2O_3$, $B_2O_3$, and $SiO_2$ as reactive glass was prepared. To form a conductive layer on the external electrode of the MLCC chip, silver nitrate ($AgNO_3$) was dissolved in water in molar concentration of 0.02 M, thereby preparing a silver nitrate solution. The MLCC chip was disposed to be in contact with the prepared silver nitrate solution at room temperature (25° C.), and after five minutes, it was observed that a conductive layer was formed on an external electrode.

Figure 6A:
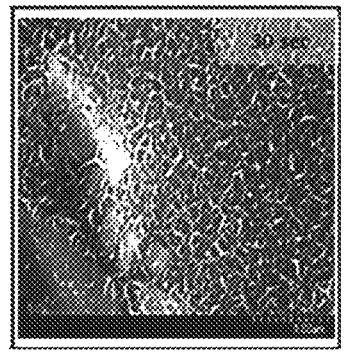
FIGS. 6a, 6b and 6c are SEM images of nanostructure constructed by treating the first electrode with $AgNO_3$ solution with contact coating method for (a) 30, (b) 150, and (c) 300 seconds according to an example embodiment of the present disclosure.
Figure 6B:
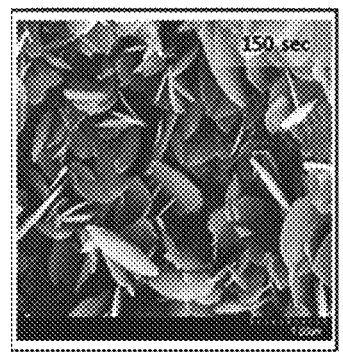
Figure 6C:
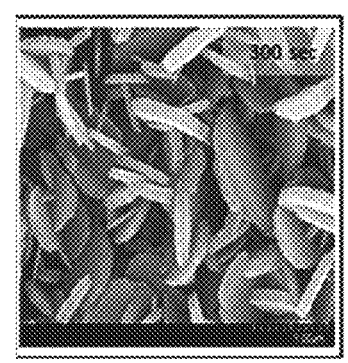
Figure 7A:
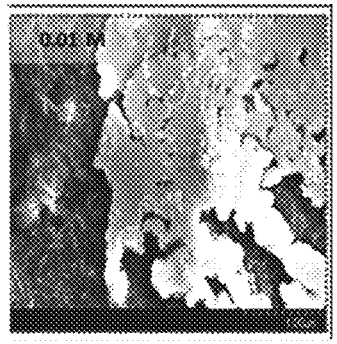
FIGS. 7a, 7b and 7c are SEM images of nanostructure constructed by treating the first electrode by dip coating method with $AgNO_3$ solution for (a) 30, (b) 150, and (c) 300 seconds according to an example embodiment of the present disclosure.
Figure 7B:
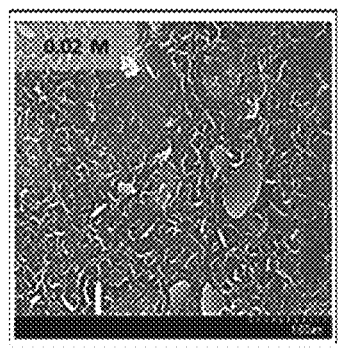
Figure 7C:
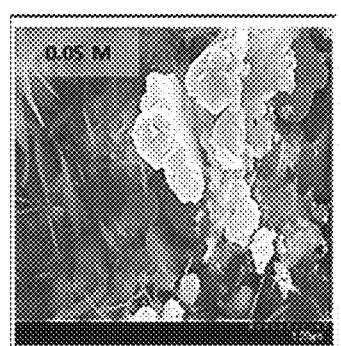

FIGS. 6a, 6b and 6c are SEM images of a surface of the external electrode after 30 seconds, 150 seconds, and 300 seconds have elapsed since the chip was in contact with silver nitrate having a molar concentration of 0.02 M. FIGS. 7a, 7b and 7c are an SEM image of a surface of the external electrode after immersing the chip in the silver nitrate solutions having a molar concentration of 0.01 M, 0.02 M, and 0.05 M for five minutes under the same conditions as in FIGS. 7a, 7b and 7c.

Referring to FIGS. 6a, 6b and 6c, the chip was in contact with the silver nitrate solution having a molar concentration Table 1 lists results of an experiment in which a molar concentration of the silver nitrate solution was varied and different methods for reaction between the external electrode and silver nitrate solution were used. In Table 1, as for Dipping, the chip was immersed in the silver nitrate solution for the reaction, and as for Contact, the chip was disposed for only the external electrode to be in contact with the silver nitrate solution for the reaction. As for Interfacial Air Gap in Primary-Secondary External Electrodes, the terminal electrode was formed in the chip in which first and second conductive layers are formed, and whether an air gap was formed in the terminal electrode was observed.

As indicated in Table 1, even when the silver nitrate solution was 0.02M, high surface roughness and improved electrical properties were implemented, and when the surface roughness was 13.0 μm or higher, an air gap in the primary-secondary external electrode was prevented.

Figure 8A:
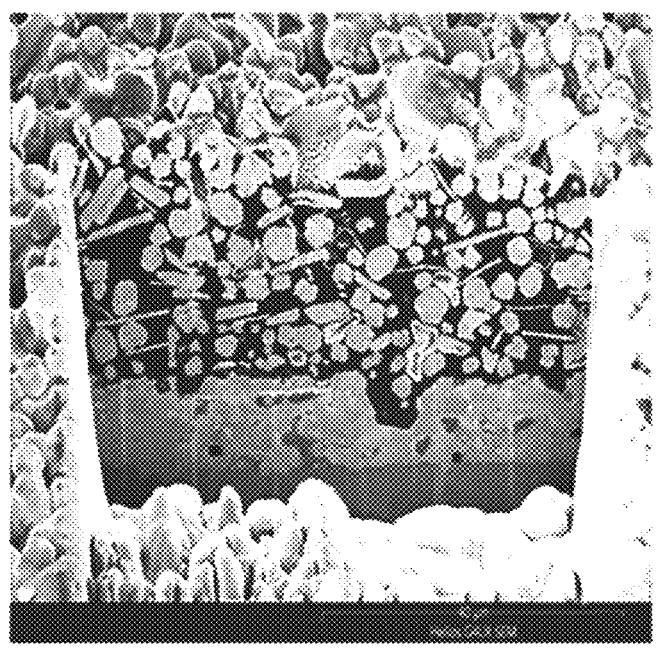
FIGS. 8a and 8b are SEM images of cross-sectional surface comprised of first and second, electrode in (a) low magnification and, (b) high magnification images of Ag nanostructures constructed in between first and second electrode according to an example embodiment of the present disclosure.
Figure 8B:
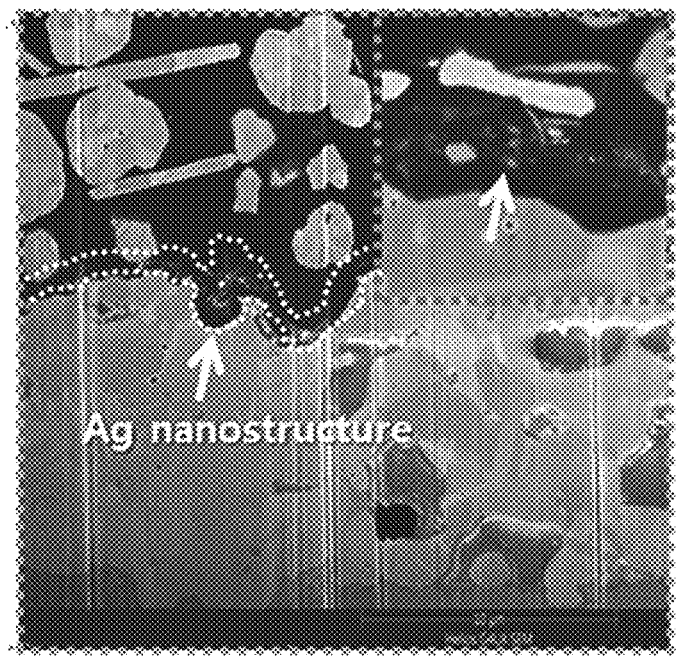
Figure 9A:
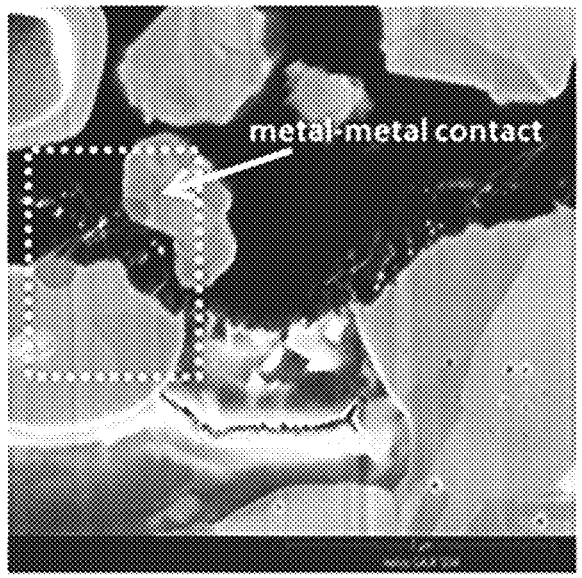
FIGS. 9a and 9b are SEM images of Ag-nanostructures constructed on the first electrode. (a) Ag nanostructures present in between first and second electrode bridging each other to provide additional electrical pathway. (b) Ag nanostructures coated and filling the pores of outer electrode according to an example embodiment of the present disclosure.
Figure 9B:
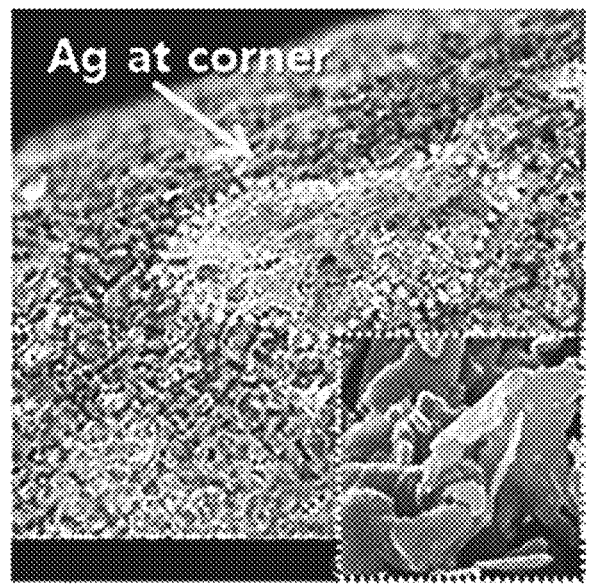
Figure 10:
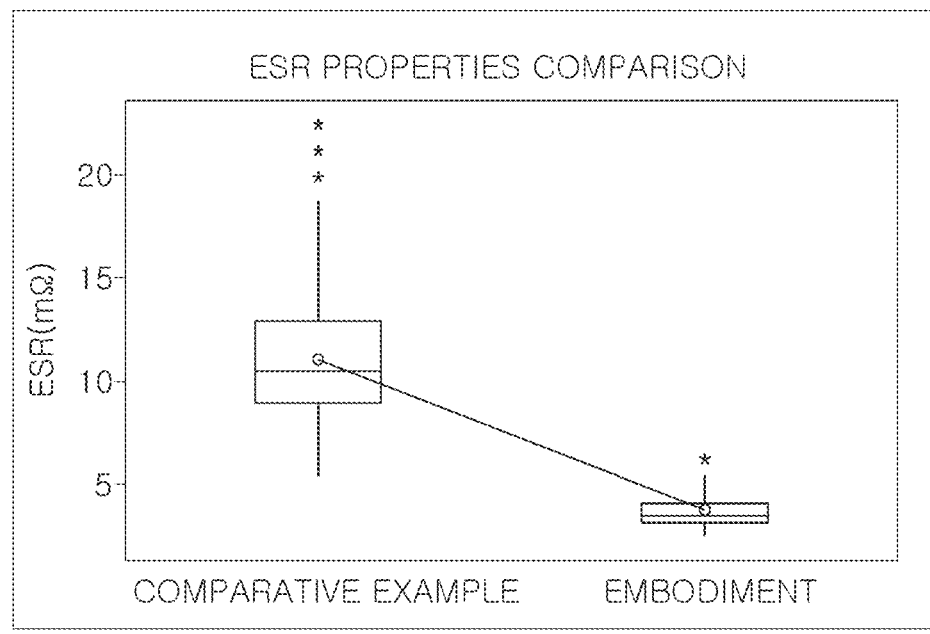
FIG. 10 is a graph illustrating ESR properties of a multilayer ceramic electronic component according to an example embodiment of the present disclosure.

FIGS. 8 and 9 are SEM images of a cross-sectional surface on which a terminal electrode is formed after the terminal electrode is formed in a chip for which a surface process was completed using a silver nitrate solution. As illustrated in FIGS. 8 and 9, in a multilayer ceramic electronic component in the example embodiment, the primary-secondary external electrode was configured to have high roughness such that the terminal electrode disposed on an outermost region may be formed on a fine structure. Also, when the surface process was performed using a silver nitrate solution, as illustrated in FIG. 10, by improving contact between the external electrodes, electrical properties (ESR properties) may improve.

According to the aforementioned example embodiments, a multilayer ceramic electronic component having a reduced thickness and having improved cohesion force between external electrodes may be provided.

Also, a multilayer ceramic electronic component having improved mechanical strength may be provided.

Further, a multilayer ceramic electronic component which may prevent an air gap between external electrodes and delamination may be provided.

While the example embodiments have been shown and described above, it will be apparent to those skilled in the art that modifications and variations could be made without departing from the scope of the present disclosure as defined by the appended claims.

What is claimed is:

1. A multilayer ceramic electronic component, comprising:
a ceramic body including a dielectric layer and first and second internal electrodes stacked in a third direction with the dielectric layer interposed therebetween, and including a first surface and a second surface opposing each other in the third direction, a third surface and a fourth surface opposing each other in a second direction, and a fifth surface and a sixth surface opposing each other in a first direction; and
first and second external electrodes disposed on the fifth surface and the sixth surface of the ceramic body, respectively,
wherein the first and second external electrodes include first and second base electrodes including a first conductive metal and reactive glass, in contact with the ceramic body, and first and second conductive layers including a second conductive metal, disposed on the first and second base electrodes, respectively,
wherein a nanostructure is disposed on surfaces of the first and second conductive layers, and
wherein the first and second conductive layers include one or more nanostructures selected from a group consisting of a nanoparticle, a nanowire, a nanorod, a nanosheet, a nanobelt, a nanodisk, a nanotube, and a nanotetrapod.

2. The multilayer ceramic electronic component of claim 1, wherein an average surface roughness, Ra, of the first and second conductive layers is 13.0 μm or greater.

3. The multilayer ceramic electronic component of claim 1, wherein the first and second conductive layers include an ingredient different from the reactive glass.

4. The multilayer ceramic electronic component of claim 1, wherein the second conductive metal has a standard reduction potential higher than a standard reduction potential of the reactive glass.

5. The multilayer ceramic electronic component of claim 3, wherein a standard reduction potential of the second conductive metal is 0.1 V or higher.

6. The multilayer ceramic electronic component of claim 1, wherein the first and second conductive layers are configured as reduction layers of the second conductive metal.

7. The multilayer ceramic electronic component of claim 1, wherein the first and second conductive layers are configured as single composition layers of the second conductive metal.

8. The multilayer ceramic electronic component of claim 1, wherein the reactive glass includes one or more elements selected from a group consisting of silicon (Si), boron (B), aluminum (Al), a transition metal, an alkali metal, an alkali earth metal, and an oxide, a nitride, a carbide, and a carbonate thereof.

9. The multilayer ceramic electronic component of claim 1, wherein an average surface roughness, Ra, of the first and second base electrodes is 1.0 μm or greater.

10. The multilayer ceramic electronic component of claim 1, further comprising:
first and second terminal electrodes configured to cover the first and second conductive layers, respectively.

11. The multilayer ceramic electronic component of claim 1, wherein the first conductive metal includes at least one metal selected from a group consisting of nickel (Ni), tin (Sn), palladium (Pd), platinum (Pt), gold (Au), silver (Ag), tungsten (W), titanium (Ti), lead (Pb), and alloys thereof.

12. The multilayer ceramic electronic component of claim 1, wherein an average surface roughness, Ra, of the first and second base electrodes is 100 μm or lower.

13. The multilayer ceramic electronic component of claim 1, wherein a standard reduction potential of the second conductive metal is 0.15 V or higher.

14. The multilayer ceramic electronic component of claim 1, wherein a standard reduction potential of the second conductive metal is 0.20 V or higher.

15. The multilayer ceramic electronic component of claim 1, wherein a standard reduction potential of the second conductive metal is 0.25 V or higher.

16. The multilayer ceramic electronic component of claim 1, wherein a standard reduction potential of the second conductive metal is 0.30 V or higher.

17. The multilayer ceramic electronic component of claim 1, wherein a standard reduction potential of the second conductive metal is 2.87 V or less.

18. The multilayer ceramic electronic component of claim 1, wherein a standard reduction potential of the second conductive metal is 1.99 V or less.

19. The multilayer ceramic electronic component of claim 1, wherein the nanostructure disposed on the surfaces of the first and second conductive layers directly contacts the first and second base electrodes, respectively.

20. The multilayer ceramic electronic component of claim 10, wherein the nanostructure disposed on the surfaces of the first and second conductive layers directly contacts the first and second terminal electrodes, respectively.

21. A multilayer ceramic electronic component, comprising:
a ceramic body including a dielectric layer and first and second internal electrodes stacked in a third direction with the dielectric layer interposed therebetween, and including a first surface and a second surface opposing each other in the third direction, a third surface and a fourth surface opposing each other in a second direction, and a fifth surface and a sixth surface opposing each other in a first direction; and
first and second external electrodes disposed on the fifth surface and the sixth surface of the ceramic body, respectively,
wherein the first and second external electrodes include first and second base electrodes including a first conductive metal and reactive glass, in contact with the ceramic body, and first and second conductive layers including a second conductive metal, disposed on the first and second base electrodes, respectively,
wherein a nanostructure is disposed on surfaces of the first and second conductive layers, and
wherein the nanostructure disposed on the surfaces of the first and second conductive layers directly contacts the first and second base electrodes, respectively.

22. A multilayer ceramic electronic component, comprising:
a ceramic body including a dielectric layer and first and second internal electrodes stacked in a third direction with the dielectric layer interposed therebetween, and including a first surface and a second surface opposing each other in the third direction, a third surface and a fourth surface opposing each other in a second direction, and a fifth surface and a sixth surface opposing each other in a first direction;

first and second external electrodes disposed on the fifth surface and the sixth surface of the ceramic body, respectively; and first and second terminal electrodes disposed on the first and second external electrodes, respectively, wherein the first and second external electrodes include first and second base electrodes including a first conductive metal and reactive glass, in contact with the ceramic body, and first and second conductive layers including a second conductive metal, disposed on the first and second base electrodes, respectively, wherein a nanostructure is disposed on surfaces of the first and second conductive layers, wherein the first and second terminal electrodes are configured to cover the first and second conductive layers, respectively, and wherein the nanostructure disposed on the surfaces of the first and second conductive layers directly contacts the first and second terminal electrodes, respectively.

* * * * *